United States Patent
Kanoh et al.

(10) Patent No.: US 10,994,744 B2
(45) Date of Patent: May 4, 2021

(54) TRAVEL CONTROL APPARATUS, TRAVEL CONTROL METHOD, AND NON-TRANSITORY COMPUTER-READABLE STORAGE MEDIUM

(71) Applicant: HONDA MOTOR CO., LTD., Tokyo (JP)

(72) Inventors: Tadahiko Kanoh, Wako (JP); Hiroaki Horii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 16/232,263

(22) Filed: Dec. 26, 2018

(65) Prior Publication Data
US 2019/0263425 A1  Aug. 29, 2019

(30) Foreign Application Priority Data
Feb. 28, 2018  (JP) .............................. JP2018-035329

(51) Int. Cl.
| | |
|---|---|
| *B60W 50/08* | (2020.01) |
| *B60W 50/14* | (2020.01) |
| *B60W 30/12* | (2020.01) |
| *G05D 1/00* | (2006.01) |
| *G05D 1/02* | (2020.01) |
| *B60K 35/00* | (2006.01) |
| *B60W 50/00* | (2006.01) |

(52) U.S. Cl.
CPC .......... *B60W 50/082* (2013.01); *B60W 30/12* (2013.01); *B60W 50/14* (2013.01); *B60K 35/00* (2013.01); *B60W 2050/007* (2013.01); *B60W 2420/42* (2013.01); *B60W 2555/60* (2020.02); *G05D 1/0061* (2013.01); *G05D 1/0088* (2013.01); *G05D 1/0231* (2013.01); *G05D 2201/0213* (2013.01)

(58) Field of Classification Search
CPC ......... B60W 60/00; B60W 2050/0072; B60W 50/14; B60W 50/082; B60W 30/12
See application file for complete search history.

(56) References Cited

U.S. PATENT DOCUMENTS

| | | | |
|---|---|---|---|
| 7,970,529 B2 | 6/2011 | Mori et al. | |
| 9,840,253 B1 * | 12/2017 | Prasad | ................. G05D 1/0246 |

(Continued)

FOREIGN PATENT DOCUMENTS

JP  4392389 B  12/2009

*Primary Examiner* — Khoi H Tram
*Assistant Examiner* — Tristan J Greiner
(74) *Attorney, Agent, or Firm* — Thomas | Horstemeyer, LLP

(57) ABSTRACT

A travel control apparatus for controlling travel of a vehicle, comprises: an acquisition unit configured to acquire external information using one of a first camera and a second camera; a specifying unit configured to specify a position of the vehicle; and a travel control unit configured to control the travel of the vehicle based on the external information acquired by the acquisition unit and the position of the vehicle specified by the specifying unit. If the acquisition unit acquires the external information using the second camera instead of the first camera, the travel control unit controls the travel of the vehicle so that participation of a driver in driving is higher than in a case in which the acquisition unit acquires the external information using the first camera.

13 Claims, 9 Drawing Sheets

(56) References Cited

U.S. PATENT DOCUMENTS

| | | | | |
|---|---|---|---|---|
| 10,449,970 | B2* | 10/2019 | Urano | B60W 30/09 |
| 2011/0241862 | A1* | 10/2011 | Debouk | B60W 50/035 |
| | | | | 340/439 |
| 2014/0303827 | A1* | 10/2014 | Dolgov | B60W 30/00 |
| | | | | 701/23 |
| 2016/0031441 | A1* | 2/2016 | Foley | B60W 50/16 |
| | | | | 701/23 |
| 2017/0270798 | A1* | 9/2017 | Ushiba | G08G 1/161 |
| 2017/0329329 | A1* | 11/2017 | Kamhi | G06K 9/00604 |
| 2018/0088572 | A1* | 3/2018 | Uchida | B60W 10/18 |
| 2018/0273053 | A1* | 9/2018 | Ruemelin | B60K 35/00 |
| 2019/0054919 | A1* | 2/2019 | Noto | G05D 1/0061 |
| 2019/0283769 | A1* | 9/2019 | Chiba | G08G 1/16 |
| 2019/0369635 | A1* | 12/2019 | Kobayashi | B60W 60/0059 |
| 2020/0039527 | A1* | 2/2020 | Hase | B60W 10/06 |
| 2020/0062275 | A1* | 2/2020 | Higgins | G06K 9/00845 |
| 2020/0180661 | A1* | 6/2020 | Honda | B60W 50/14 |
| 2020/0183411 | A1* | 6/2020 | Oba | B60W 30/165 |

* cited by examiner

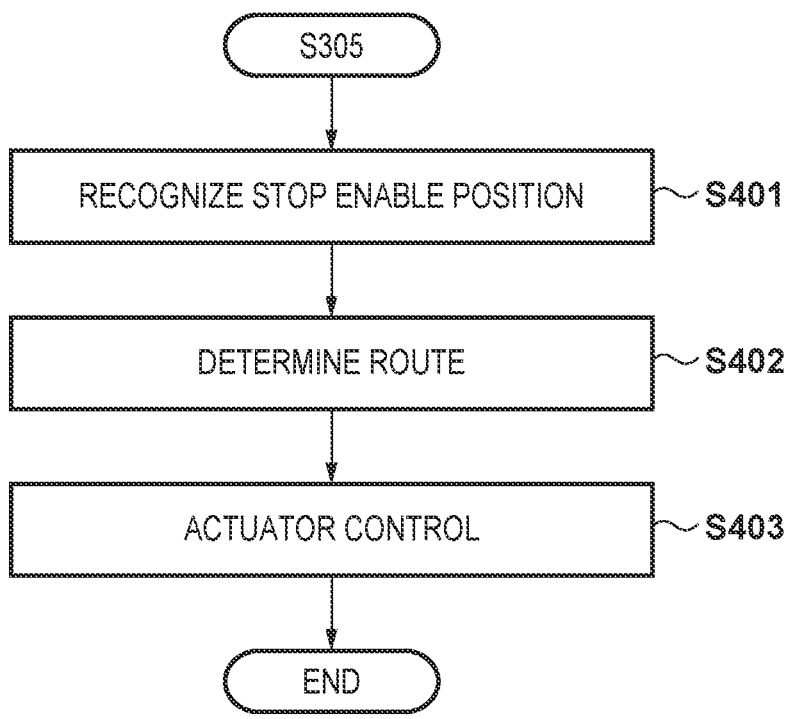
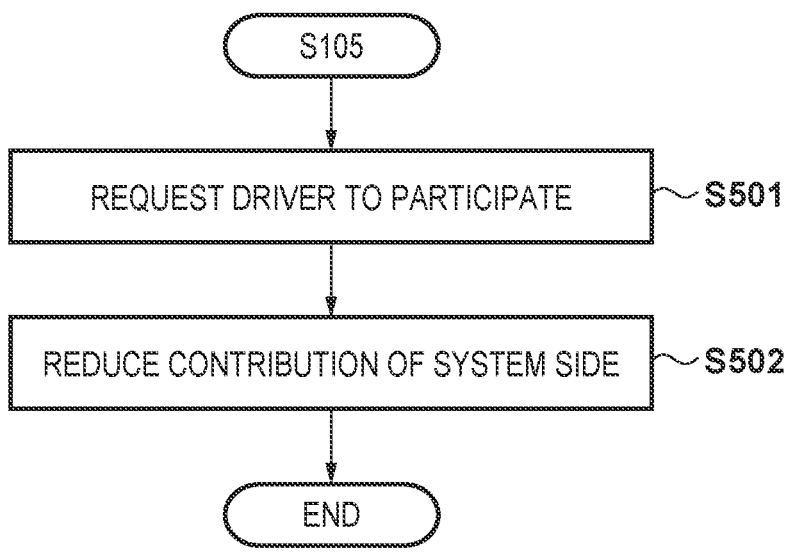

TRAVEL CONTROL APPARATUS, TRAVEL CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2018-035329 filed on Feb. 28, 2018, the entire disclosure of which is incorporated herein by reference.

BACKGROUND OF THE INVENTION

Field of the Invention

The present invention relates to a travel control apparatus for controlling travel of a self-vehicle, a travel control method, and a non-transitory computer-readable storage medium.

Description of the Related Art

Recognizing a lane based on an image capturing result obtained by capturing a road by a CCD camera or the like installed in a vehicle is being performed. Japanese Patent No. 4392389 describes a technique in which if a lane cannot be estimated by image processing, information of a lane estimated based on map data and position information is used as a complement.

However, a factor that makes it impossible to estimate a road shape such as a lane by image processing can be a factor related to the operation of a camera. In this case, it is necessary to appropriately control travel of a vehicle performed at this time.

SUMMARY OF THE INVENTION

The present invention provides a travel control apparatus for controlling travel of a vehicle appropriately in accordance with the state of a camera, a travel control method, and a non-transitory computer-readable storage medium.

According to the present invention, there is provided a travel control apparatus for controlling travel of a vehicle, comprising: an acquisition unit configured to acquire external information using one of a first camera and a second camera; a specifying unit configured to specify a position of the vehicle; and a travel control unit configured to control the travel of the vehicle based on the external information acquired by the acquisition unit and the position of the vehicle specified by the specifying unit, wherein if the acquisition unit acquires the external information using the second camera instead of the first camera, the travel control unit controls the travel of the vehicle so that participation of a driver in driving is higher than in a case in which the acquisition unit acquires the external information using the first camera.

According to the present invention, there is also provided a travel control apparatus for controlling travel of a vehicle, comprising: an acquisition unit configured to acquire external information using one of a first camera and a second camera; a device configured to specify a position of the vehicle; and a travel control unit configured to control the travel of the vehicle based on the external information acquired by the acquisition unit and the position of the vehicle specified by the device, wherein if a state is set in which at least one of the first camera, the second camera, and the device cannot operate, the travel control unit controls the travel of the vehicle so that participation of a driver in driving is higher than in a case in which the first camera, the second camera, and the device can operate.

According to the present invention, there is also provided a travel control method executed in a travel control apparatus for controlling travel of a vehicle, comprising: acquiring external information using one of a first camera and a second camera; specifying a position of the vehicle; and controlling the travel of the vehicle based on the external information acquired in the acquiring and the position of the vehicle specified in the specifying, wherein if the external information is acquired in the acquiring using the second camera instead of the first camera, the travel of the vehicle is controlled in the controlling so that participation of a driver in driving is higher than in a case in which the external information is acquired in the acquiring using the first camera.

According to the present invention, there is also provided a travel control method of controlling travel of a vehicle, comprising: acquiring external information using one of a first camera and a second camera; specifying a position of the vehicle by a device configured to specify the position of the vehicle; and controlling the travel of the vehicle based on the external information acquired in the acquiring and the position of the vehicle specified in the specifying, wherein if a state is set in which at least one of the first camera, the second camera, and the device cannot operate, the travel of the vehicle is controlled in the controlling so that participation of a driver in driving is higher than in a case in which the first camera, the second camera, and the device can operate.

According to the present invention, there is also provided a non-transitory computer-readable storage medium storing a program for causing a computer to: acquire external information using one of a first camera and a second camera; specify a position of a vehicle; and control travel of the vehicle based on the acquired external information and the specified position of the vehicle, wherein if the external information is acquired using the second camera instead of the first camera, the travel of the vehicle is controlled so that participation of a driver in driving is higher than in a case in which the external information is acquired using the first camera.

According to the present invention, there is also provided a non-transitory computer-readable storage medium storing a program for causing a computer to: acquire external information using one of a first camera and a second camera; and control travel of a vehicle based on the acquired external information and a position of the vehicle specified by a device configured to specify the position of the vehicle, wherein if a state is set in which at least one of the first camera, the second camera, and the device cannot operate, the travel of the vehicle is controlled so that participation of a driver in driving is higher than in a case in which the first camera, the second camera, and the device can operate.

According to the present invention, it is possible to control travel of a vehicle appropriately in accordance with the state of a camera.

BRIEF DESCRIPTION OF THE DRAWINGS

FIG. 8 is a flowchart illustrating fallback control processing;

FIG. 9 is a flowchart illustrating driving control switching processing;

DESCRIPTION OF THE EMBODIMENTS

Figure 1:
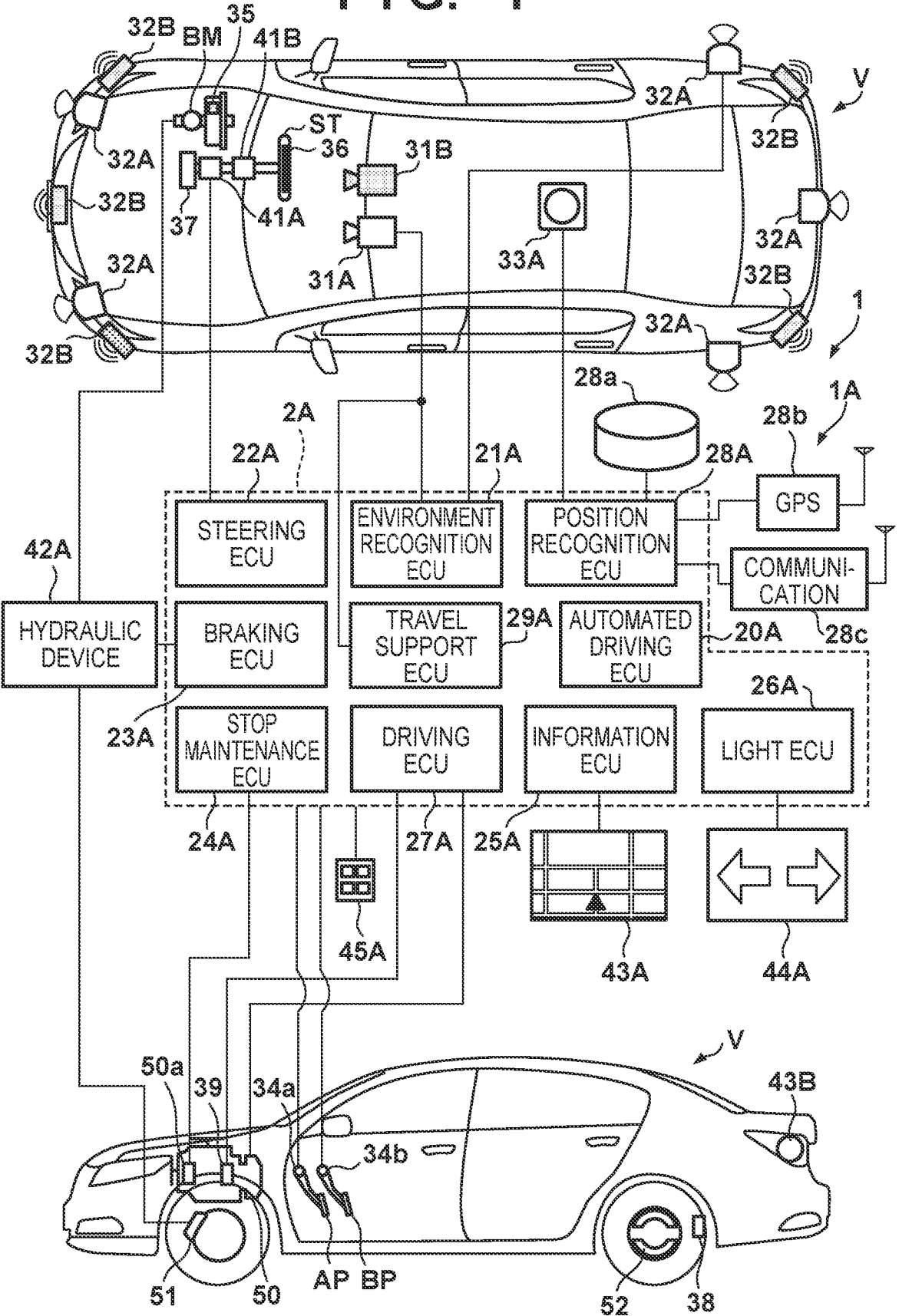
FIG. 1 is a block diagram showing a vehicle control system.
Figure 2:
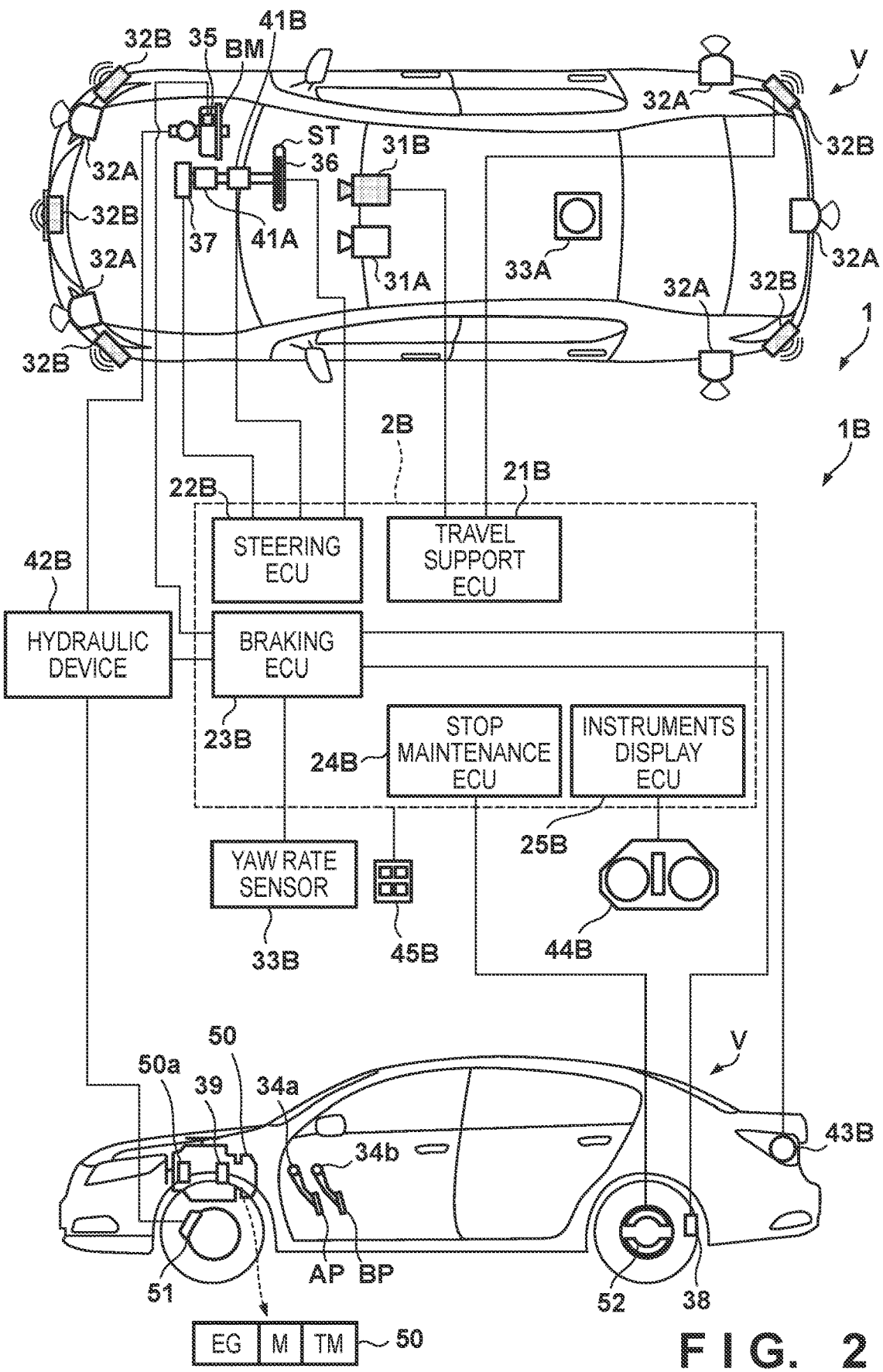
FIG. 2 is a block diagram showing the vehicle control system.
Figure 3:
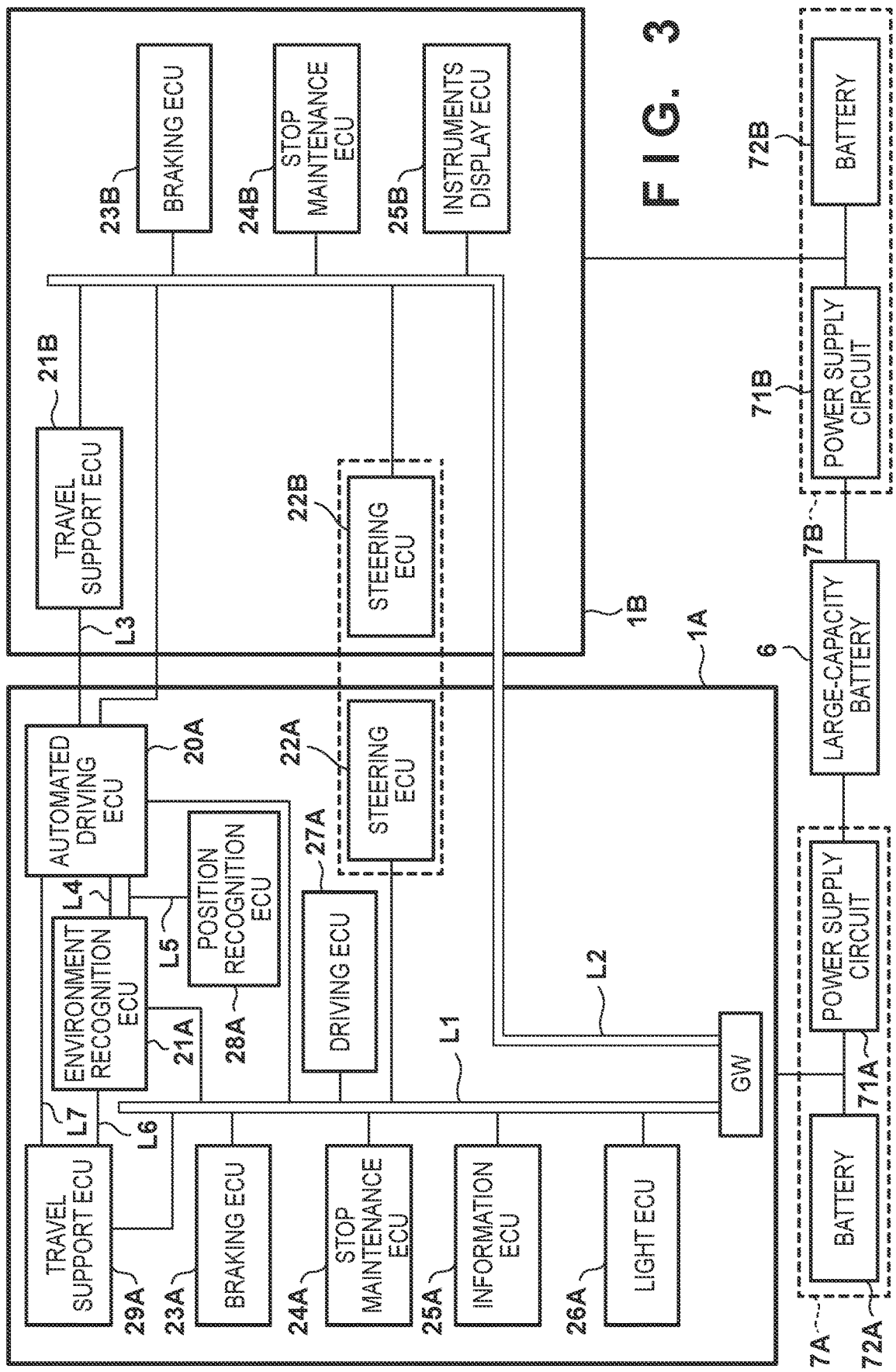
FIG. 3 is a block diagram showing the vehicle control system.

FIGS. 1 to 3 are block diagrams each showing a vehicle control system 1 according to an embodiment. The control system 1 controls a vehicle V. Referring to FIGS. 1 and 2, plan views and side views show an outline of the vehicle V. As an example, the vehicle V is a sedan-type four-wheeled vehicle. The control system 1 includes control apparatuses 1A and 1B. FIG. 1 is a block diagram showing the control apparatus 1A, and FIG. 2 is a block diagram showing the control apparatus 1B. FIG. 3 mainly shows the arrangement of power supplies and communication lines between the control apparatuses 1A and 1B. The arrangement shown in FIG. 3 can serve as a computer that implements the present invention according to a program.

The control apparatuses 1A and 1B multiplex some functions implemented by the vehicle V or make some of these functions redundant. This can improve the reliability of the system. The control apparatus 1A performs, for example, travel support control concerning risk avoidance or the like in addition to automated driving control and normal operation control in manual driving. Those terms concerning "control" such as "travel control" also mean "vehicle control". The control apparatus 1B mainly manages travel support control concerning risk avoidance or the like. Travel support will be sometimes referred to as driving support hereinafter. By making functions redundant in the control apparatuses 1A and 1B and causing them to perform different control processes, it is possible to distribute control processing and improve the reliability.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M can be used as a driving source that accelerates the vehicle V and also used as an electric generator at the time of deceleration or the like (regenerative braking).

<Control Apparatus 1A>

The arrangement of the control apparatus 1A will be described with reference to FIG. 1. The control apparatus 1A includes an ECU group (control unit group) 2A. The ECU group 2A includes a plurality of ECUs 20A to 29A. Each ECU includes a processor represented by a CPU (Central Processing Unit), a storage device such as a semiconductor memory, and an interface with an external device. The storage device stores a program to be executed by the processor, data to be used by the processor for processing, and the like. Each ECU may include a plurality of processors, a plurality of storage devices, and a plurality of interfaces. Note that the number of ECUs and functions provided by the ECUs can be designed appropriately, and the ECUs can be subdivided or integrated, as compared with this embodiment. Note that FIGS. 1 and 3 show the names of the representative functions of the ECUs 20A to 29A. For example, the ECU 20A is represented as an "automated driving ECU".

The ECU 20A executes control concerning automated driving as travel control of the vehicle V. In automated driving, at least one of driving (acceleration of the vehicle V by the power plant 50 or the like), steering, and braking of the vehicle V is automatically performed regardless of a driving operation of a driver. In this embodiment, driving, steering, and braking are automatically performed.

The ECU 21A serves as an environment recognition unit that recognizes the travel environment of the vehicle V based on the detection results of detection units 31A and 32A for detecting the peripheral status of the vehicle V. The ECU 21A generates target data as peripheral environment information.

In this embodiment, the detection unit 31A serves as an image capturing device (to be sometimes referred to as the camera 31A hereinafter) that detects an object nearby the vehicle V by image capturing. The camera 31A is provided on the roof front of the vehicle V, inside of the vehicle interior and by the windshield, so as to be able to capture the front side of the vehicle V. When images captured by the cameras 31A are analyzed, the contour of a target or a division line (a white line or the like) of a lane on a road can be extracted.

In this embodiment, the detection unit 32A serves as a LIDAR (Light Detection and Ranging) (to be sometimes referred to as the LIDAR 32A hereinafter) that detects an object nearby the vehicle V using light, and detects a target nearby the vehicle V and measures a distance to the target. In this embodiment, five LIDARs 32A are provided; one at each corner of the front portion of the vehicle V, one at the center of the rear portion, and one on each side of the rear portion. The number of LIDARs 32A and their arrangement can be selected appropriately.

The ECU 29A serves as a travel support unit that executes control concerning travel support (in other words, driving support) as travel control of the vehicle V based on the detection result of the detection unit 31A.

The ECU 22A serves as a steering control unit that controls an electric power steering device 41A. The electric power steering device 41A includes a mechanism that steers front wheels in accordance with a driving operation (steering operation) of the driver on a steering wheel ST. The electric power steering device 41A includes a motor that generates a driving force to assist the steering operation or automatically steer the front wheels, a sensor that detects the rotation amount of a motor, and a torque sensor that detects a steering torque borne by the driver.

The ECU 23A serves as a braking control unit that controls a hydraulic device 42A. A braking operation of the driver on a brake pedal BP is converted into a hydraulic pressure in a brake master cylinder BM, and transferred to the hydraulic device 42A. The hydraulic device 42A is an actuator that can control, based on the hydraulic pressure transferred from the brake master cylinder BM, the hydraulic pressure of hydraulic oil to be supplied to a brake device (for example, a disc brake device) 51 provided in each of the four wheels, and the ECU 23A controls driving of a solenoid valve or the like provided in the hydraulic device 42A. In this embodiment, the ECU 23A and the hydraulic device 42A form an electric servo brake, and the ECU 23A controls distribution of, for example, braking forces generated by the four brake devices 51 and a braking force generated by regenerative braking of the motor M.

The ECU 24A serves as a stop maintenance control unit that controls an electric parking lock device 50a provided in the automatic transmission TM. The electric parking lock device 50a mainly includes a mechanism that locks the internal mechanism of the automatic transmission TM at the time of selection of a P range (parking range). The ECU 24A can control locking and unlocking by the electric parking lock device 50a.

The ECU 25A serves as an internal notification control unit that controls an information output device 43A for making a notification of information inside the vehicle. The information output device 43A includes, for example, a voice output device and a display device such as a head-up display. The information output device 43A may further include a vibration device. The ECU 25A causes the information output device 43A to output, for example, various kinds of information such as a vehicle speed and an outside air temperature and information such as route guidance.

The ECU 26A serves as an external notification control unit that controls an information output device 44A for making a notification of information outside the vehicle. In this embodiment, the information output device 44A is a direction indicator (hazard lamp), and the ECU 26A can make a notification of the advancing direction of the vehicle V outside the vehicle by controlling blinking of the information output device 44A as a direction indicator, and raise the attention of the outside to the vehicle V by controlling blinking of the information output device 44A as a hazard lamp.

The ECU 27A serves as a driving control unit that controls the power plant 50. In this embodiment, one ECU 27A is assigned to the power plant 50 but one ECU may be assigned to each of the internal combustion engine EG, the motor M, and the automatic transmission TM. The ECU 27A controls the outputs of the internal combustion engine EG and motor M and switches the gear range of the automatic transmission TM in accordance with a driving operation of the driver, the vehicle speed, and the like detected by an operation detection sensor 34a provided in an accelerator pedal AP and an operation detection sensor 34b provided in the brake pedal BP. Note that a rotation speed sensor 39 that detects the rotation speed of the output shaft of the automatic transmission TM is provided, in the automatic transmission TM, as a sensor that detects the travel state of the vehicle V. The vehicle speed of the vehicle V can be calculated based on the detection result of the rotation speed sensor 39.

The ECU 28A serves as a position recognition unit that recognizes the current position and course of the vehicle V. The ECU 28A controls a gyro sensor 33A, a GPS sensor 28b, and a communication device 28c, and performs information processing of a detection result or a communication result. The gyro sensor 33A detects a rotary motion of the vehicle V. The course of the vehicle V can be determined based on the detection result of the gyro sensor 33A and the like. The GPS sensor 28b detects the current position of the vehicle V. The communication device 28c performs wireless communication with a server that provides map information or traffic information and acquires these pieces of information. A database 28a can store high-precision map information, and the ECU 28A can specify the position of the vehicle V on the lane more precisely based on the map information and the like. The communication device 28c is also used for inter-vehicle communication or road-to-vehicle communication, and can acquire, for example, information of another vehicle.

An input device 45A is arranged in the vehicle so as to be operable by the driver, and accepts input of an instruction or information from the driver.

<Control Apparatus 1B>

The arrangement of the control apparatus 1B will be described with reference to FIG. 2. The control apparatus 1B includes an ECU group (control unit group) 2B. The ECU group 2B includes a plurality of ECUs 21B to 25B. Each ECU includes a processor represented by a CPU or GPU, a storage device such as a semiconductor memory, and an interface with an external device. The storage device stores a program to be executed by the processor, data to be used by the processor for processing, and the like. Each ECU may include a plurality of processors, a plurality of storage devices, and a plurality of interfaces. Note that the number of ECUs and functions provided by the ECUs can be designed appropriately, and the ECUs can be subdivided or integrated, as compared with this embodiment. Note that FIGS. 2 and 3 show the names of the representative functions of the ECUs 21B to 25B, similar to the ECU group 2A.

The ECU 21B serves as an environment recognition unit that recognizes the travel environment of the vehicle V based on the detection results of detection units 31B and 32B for detecting the peripheral status of the vehicle V, and also serves as a travel support unit that executes control concerning travel support (in other words, driving support) as travel control of the vehicle V. The ECU 21B generates target data as peripheral environment information.

Note that in this embodiment, the ECU 21B is configured to have the environment recognition function and the travel support function. However, an ECU may be provided for each function, like the ECUs 21A and 29A of the control apparatus 1A. To the contrary, the control apparatus 1A may have an arrangement in which the functions of the ECUs 21A and 29A are implemented by one ECU, like the ECU 21B.

In this embodiment, the detection unit 31B serves as an image capturing device (to be sometimes referred to as the camera 31B hereinafter) that detects an object nearby the vehicle V by image capturing. The camera 31B is provided, on the roof front of the vehicle V, inside of the vehicle interior and by the windshield, so as to be able to capture the front side of the vehicle V. When images captured by the cameras 31B are analyzed, the contour of a target or a division line (a white line or the like) of a lane on a road can be extracted. In this embodiment, the detection unit 32B (to be sometimes referred to as the radar 32B hereinafter) serves as a millimeter wave radar that detects an object nearby the vehicle V using a radio wave, and detects a target nearby the vehicle V or measures a distance to a target. In this embodiment, five radars 32B are provided; one at the center of the front portion of the vehicle V, one at each corner of the front portion, and one at each corner of the rear portion. The number of radars 32B and their arrangement can be selected appropriately.

The ECU 22B is a steering control unit that controls an electric power steering device 41B. The electric power steering device 41B includes a mechanism that steers the front wheels in accordance with a driving operation (steering operation) of the driver on the steering wheel ST. The electric power steering device 41B includes a motor that generates a driving force to assist the steering operation or automatically steer the front wheels, a sensor that detects the rotation amount of a motor, and a torque sensor that detects a steering torque borne by the driver. A steering angle sensor 37 is electrically connected to the ECU 22B via a communication line L2 (to be described later), and it is possible to control the electric power steering device 41B based on the detection result of the steering angle sensor 37. The ECU 22B can acquire the detection result of a sensor 36 that detects whether the driver grips the steering wheel ST, and can monitor the gripping state of the driver.

The ECU 23B serves as a braking control unit that controls a hydraulic device 42B. A braking operation of the driver on the brake pedal BP is converted into a hydraulic pressure in the brake master cylinder BM, and transferred to the hydraulic device 42B. The hydraulic device 42B is an actuator that can control, based on the hydraulic pressure transferred from the brake master cylinder BM, the hydraulic pressure of hydraulic oil to be supplied to the brake device 51 of each wheel, and the ECU 23B controls driving of a solenoid valve or the like provided in the hydraulic device 42B.

In this embodiment, wheel speed sensors 38 respectively provided in the four wheels, a yaw rate sensor 33B, and a pressure sensor 35 that detects a pressure in the brake master cylinder BM are electrically connected to the ECU 23B and the hydraulic device 42B, thereby implementing, based on the detection results of these sensors, an ABS function, traction control, and a function of controlling the orientation of the vehicle V. For example, the ECU 23B adjusts the braking force of each wheel based on the detection result of the wheel speed sensor 38 provided in each of the four wheels, thereby suppressing skidding of each wheel. In addition, the braking force of each wheel is adjusted based on the rotation angular velocity around the vertical axis of the vehicle V, that has been detected by the yaw rate sensor 33B, thereby suppressing an abrupt change in orientation of the vehicle V.

The ECU 23B also functions as an external notification control unit that controls an information output device 43B for making a notification of information outside the vehicle. In this embodiment, the information output device 43B serves as a brake lamp, and the ECU 23B can turn on the brake lamp at the time of braking or the like. This can raise the attention of a following vehicle to the vehicle V.

The ECU 24B serves as a stop maintenance control unit that controls an electric parking brake device (for example, a drum brake) 52 provided in a rear wheel. The electric parking brake device 52 includes a mechanism that locks the rear wheel. The ECU 24B can control locking and unlocking of the rear wheel by the electric parking brake device 52.

The ECU 25B serves as an internal notification control unit that controls an information output device 44B for making a notification of information inside the vehicle. In this embodiment, the information output device 44B includes a display device arranged in an instrument panel. The ECU 25B can cause the information output device 44B to output various kinds of information such as a vehicle speed and fuel consumption.

An input device 45B is arranged in the vehicle so as to be operable by the driver, and accepts input of an instruction or information from the driver.

<Communication Line>

Examples of communication lines of the control system 1, that communicably connect the ECUs, will be described with reference to FIG. 3. The control system 1 includes wired communication lines L1 to L7. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 connects the ECUs 20A and 21B. The communication line L4 connects the ECUs 20A and 21A. The communication line L5 connects the ECUs 20A, 21A, and 28A. The communication line L6 connects the ECUs 29A and 21A. The communication line L7 connects the ECUs 29A and 20A.

The communication lines L1 to L7 may use the same protocol or different protocols, and may use different protocols in accordance with a communication environment such as a communication speed, communication amount, or durability. For example, the communication lines L3 and L4 may use Ethernet® in terms of the communication speed. For example, the communication lines L1, L2 and L5 to L7 may use CAN.

The control apparatus 1A includes a gateway GW. The gateway GW relays the communication lines L1 and L2. Therefore, for example, the ECU 21B can output a control command to the ECU 27A via the communication line L2, the gateway GW, and the communication line L1.

<Power Supply>

The power supply of the control system 1 will be described with reference to FIG. 3. The control system 1 includes a large-capacity battery 6 and power supplies 7A and 7B. The large-capacity battery 6 is a battery that is used to drive the motor M and is charged by the motor M.

The power supply 7A is a power supply that supplies power to the control apparatus 1A, and includes a power supply circuit 71A and a battery 72A. The power supply circuit 71A is a circuit that supplies power of the large-capacity battery 6 to the control apparatus 1A, and lowers, for example, the output voltage (for example, 190 V) of the large-capacity battery 6 to a reference voltage (for example, 12 V). The battery 72A is, for example, a 12-V lead battery. By providing the battery 72A, it is possible to supply power to the control apparatus 1A even if power supply of the large-capacity battery 6 or the power supply circuit 71A is interrupted or decreases.

The power supply 7B is a power supply that supplies power to the control apparatus 1B, and includes a power supply circuit 71B and a battery 72B. The power supply circuit 71B is a circuit similar to the power supply circuit 71A, and is a circuit that supplies power of the large-capacity battery 6 to the control apparatus 1B. The battery 72B is a battery similar to the battery 72A, and is, for example, a 12-V lead battery. By providing the battery 72B, it is possible to supply power to the control apparatus 1B even if power supply of the large-capacity battery 6 or the power supply circuit 71B is interrupted or decreases.

<Redundancy>

The common functions of the control apparatuses 1A and 1B will be described. It is possible to improve the reliability of the control system 1 by making the same functions redundant. With respect to some of the functions made redundant, not completely the same functions are multiplexed and different functions are exhibited. This suppresses an increase in cost due to redundancy of the functions.

[Actuator System]

Steering

The control apparatus 1A includes the electric power steering device 41A and the ECU 22A that controls the electric power steering device 41A. The control apparatus 1B includes the electric power steering device 41B and the ECU 22B that controls the electric power steering device 41B.

Braking

The control apparatus 1A includes the hydraulic device 42A and the ECU 23A that controls the hydraulic device 42A. The control apparatus 1B includes the hydraulic device 42B and the ECU 23B that controls the hydraulic device 42B. Each of these apparatuses can be used for braking of the vehicle V. On the other hand, the braking mechanism of the control apparatus 1A has the main function of distributing the braking forces generated by the brake devices 51 and the braking force generated by regenerative braking of the motor M while the braking mechanism of the control apparatus 1B has the main function of controlling the orientation. These apparatuses commonly perform braking but exhibit different functions.

Stop Maintenance

The control apparatus 1A includes the electric parking lock device 50a and the ECU 24A that controls the electric parking lock device 50a. The control apparatus 1B includes the electric parking brake device 52 and the ECU 24B that controls the electric parking brake device 52. Each of these apparatuses can be used to maintain the stop of the vehicle V. On the other hand, the electric parking lock device 50a is a device that functions at the time of selection of the P range of the automatic transmission TM while the electric parking brake device 52 locks the rear wheel. These apparatuses commonly maintain the stop of the vehicle V but exhibit different functions.

Internal Notification

The control apparatus 1A includes the information output device 43A and the ECU 25A that controls the information output device 43A. The control apparatus 1B includes the information output device 44B and the ECU 25B that controls the information output device 44B. Each of these apparatuses can be used to notify the driver of information. On the other hand, the information output device 43A is, for example, a head-up display, and the information output device 44B is a display device for instruments. These apparatuses commonly make an in-vehicle notification but can adopt different display devices.

External Notification

The control apparatus 1A includes the information output device 44A and the ECU 26A that controls the information output device 44A. The control apparatus 1B includes the information output device 43B and the ECU 23B that controls the information output device 43B. Each of these apparatuses can be used to make a notification of information outside the vehicle. On the other hand, the information output device 44A is a direction indicator (hazard lamp), and the information output device 43B is a brake lamp. These apparatuses commonly make an external notification but exhibit different functions.

Difference

While the control apparatus 1A includes the ECU 27A that controls the power plant 50, the control apparatus 1B includes no proprietary ECU that controls the power plant 50. In this embodiment, each of the control apparatuses 1A and 1B can perform steering, braking, and stop maintenance singly. Even if, in one of the control apparatuses 1A and 1B, the performance lowers, the power supply is interrupted, or communication is interrupted, it is possible to maintain the stop state by deceleration while suppressing deviation from a lane. As described above, the ECU 21B can output a control command to the ECU 27A via the communication line L2, the gateway GW, and the communication line L1, and the ECU 21B can also control the power plant 50. By providing, in the control apparatus 1B, no proprietary ECU that controls the power plant 50, it is possible to suppress an increase in cost. However, such a proprietary ECU may be provided.

[Sensor System]

Detection of Peripheral Status

The control apparatus 1A includes the detection units 31A and 32A. The control apparatus 1B includes the detection units 31B and 32B. Each of these apparatuses can be used to recognize the travel environment of the vehicle V. On the other hand, the detection unit 32A is a LIDAR and the detection unit 32B is a radar. The LIDAR is generally advantageous in detecting a shape. The radar is generally more advantageous than the LIDAR in terms of cost. By using these sensors having different characteristics, it is possible to improve the performance of recognition of a target and reduce the cost. The detection units 31A and 31B are cameras but cameras having different characteristics may be used. For example, one of the cameras may have a resolution higher than that of the other. The cameras may have different angles of view.

When the control apparatuses 1A and 1B are compared with each other, the detection units 31A and 32A have detection characteristics different from those of the detection units 31B and 32B. In this embodiment, the detection unit 32A is a LIDAR, and generally has high performance of detecting the edge of a target, as compared with the radar (detection unit 32B). In addition, a radar generally has relative speed detection accuracy and weather resistance superior to a LIDAR.

If the camera 31A has a resolution higher than that of the camera 31B, the detection units 31A and 32A have detection performance higher than that of the detection units 31B and 32B. By combining a plurality of sensors different in detection characteristic and cost, it may be possible to obtain the cost advantage for the overall system. Furthermore, by combining sensors different in detection characteristic, it is possible to reduce detection omission or erroneous detection, as compared with a case in which the same sensors are redundant.

Vehicle Speed

The control apparatus 1A includes the rotation speed sensor 39. The control apparatus 1B includes the wheel speed sensors 38. Each of these apparatuses can be used to detect the vehicle speed. On the other hand, the rotation speed sensor 39 is used to detect the rotation speed of the output shaft of the automatic transmission TM, and each wheel speed sensor 38 is used to detect the rotation speed of the corresponding wheel. These sensors can commonly detect the vehicle speed but detection targets are different.

Yaw Rate

The control apparatus 1A includes the gyro sensor 33A. The control apparatus 1B includes the yaw rate sensor 33B. Each of these apparatuses can be used to detect the angular velocity around the vertical axis of the vehicle V. On the other hand, the gyro sensor 33A is used to determine the course of the vehicle V, and the yaw rate sensor 33B is used to, for example, control the orientation of the vehicle V. These sensors can commonly detect the angular velocity of the vehicle V but have different use purposes.

Steering Angle and Steering Torque

The control apparatus 1A includes a sensor that detects the rotation amount of the motor of the electric power steering device 41A. The control apparatus 1B includes the steering angle sensor 37. Each of these apparatuses can be used to detect the steering angle of each front wheel. In the control apparatus 1A, it is possible to suppress an increase in cost by using the sensor that detects the rotation amount of the motor of the electric power steering device 41A without additionally providing the steering angle sensor 37. However, the steering angle sensor 37 may be additionally provided in the control apparatus 1A.

Since each of the electric power steering devices 41A and 41B includes a torque sensor, each of the control apparatuses 1A and 1B can recognize a steering torque.

Braking Operation Amount

The control apparatus 1A includes the operation detection sensor 34b. The control apparatus 1B includes the pressure sensor 35. Each of these apparatuses can be used to detect the braking operation amount of the driver. On the other hand, the operation detection sensor 34b is used to control distribution of the braking forces generated by the four brake devices 51 and the braking force generated regenerative braking of the motor M, and the pressure sensor 35 is used for, for example, orientation control. These sensors commonly detect the braking operation amount but have different use purposes.

[Power Supply]

The control apparatus 1A receives supply of power from the power supply 7A, and the control apparatus 1B receives supply of power from the power supply 7B. Even if the power supply of one of the power supplies 7A and 7B is interrupted or decreases, power is supplied to one of the control apparatuses 1A and 1B, and it is thus possible to ensure the power supply more reliably, and improve the reliability of the control system 1. If the power supply of the power supply 7A is interrupted or decreases, it is difficult to perform communication between the ECUs by interposing the gateway GW provided in the control apparatus 1A. However, in the control apparatus 1B, the ECU 21B can communicate with the ECUs 22B to 24B and 44B via the communication line L2.

[Redundancy in Control Apparatus 1A]

The control apparatus 1A includes the ECU 20A that controls automated driving and the ECU 29A that controls travel support, and includes two control units that control travel.

<Example of Control Function>

Control functions executable in the control apparatus 1A or 1B include a travel-related function concerning control of driving, braking, and steering of the vehicle V and a notification function concerning notification of information to the driver.

Examples of the travel-related function are a lane keep control function, a lane deviation suppression control function (road deviation suppression control function), a lane change control function, a preceding vehicle tracking control function, a collision reduction brake control function, and an erroneous start suppression control function. Examples of the notification function are an adjacent vehicle notification control function and a preceding vehicle start notification control function.

The lane keep control function is one function of controlling the position of the vehicle with respect to a lane, and controls the vehicle to travel automatically (independently of a driving operation of the driver) on a travel track set in the lane. The lane deviation suppression control function is one function of controlling the position of the vehicle with respect to a lane, and detects a white line or a median strip and performs steering automatically so the vehicle does not exceed the line. The lane deviation suppression control function and the lane keep control function are different.

The lane change control function controls to cause the vehicle to automatically move to the adjacent lane from the lane on which the vehicle currently travels. The preceding vehicle tracking control function controls the vehicle to automatically track another vehicle traveling in front of the self-vehicle. The collision reduction brake control function controls to support collision avoidance by automatic braking when the possibility of collision with an obstacle in front of the vehicle becomes high. The erroneous start suppression control function controls to restrict acceleration of the vehicle when the driver performs a predetermined amount or more of an acceleration operation in the stop state of the vehicle, thereby suppressing a sudden start.

The adjacent vehicle notification control function controls to notify the driver of the existence of another vehicle traveling on the lane adjacent to the travel lane of the self-vehicle, and notifies the driver of, for example, the existence of another vehicle traveling on the lateral side or rear side of the self-vehicle. The preceding vehicle start notification control function controls to make a notification that the self-vehicle and another vehicle in front of it are in a stop state and the other vehicle starts. These notifications can be made by the above-described internal notification devices (information output devices 43A and 44B).

The ECUs 20A, 29A, and 21B can share and execute these control functions. It is possible to appropriately select a specific control function to be applied to a specific ECU.

Figure 4:
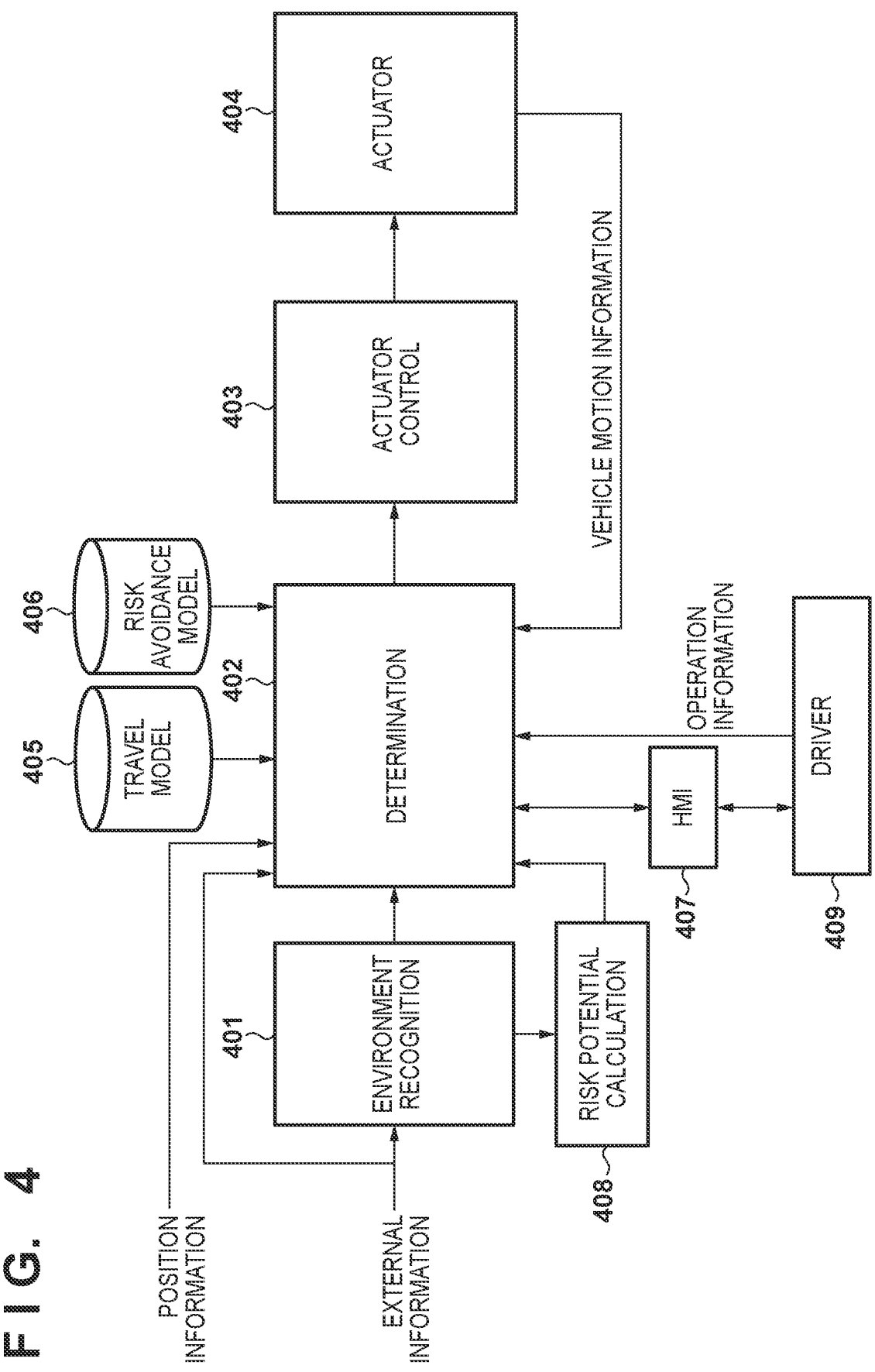
FIG. 4 is a view showing a block arrangement up to control of an actuator.

FIG. 4 is a view showing a block arrangement from acquisition of external information to control of an actuator, in a vehicle V A block 401 shown in FIG. 4 is implemented by, for example, the ECU 21A shown in FIG. 1. The block 401 acquires external information of the vehicle V. Examples of the external information are pieces of image information and pieces of detection information acquired by the detection units 31A, 31B, 32A, and 32B (cameras, radar, and LIDAR) mounted on the vehicle V. Alternatively, the external information may be acquired by inter-vehicle communication or road-to-vehicle communication. The block 401 recognizes an obstacle such as a guardrail or median strip, a traffic sign, or the like, and outputs a recognition result to blocks 402 and 408. The block 408 is implemented by, for example, the ECU 29A shown in FIG. 1, and calculates, based on the information of the obstacle, a pedestrian, another vehicle, and the like recognized by the block 401, a risk potential in determining an optimum route, and outputs a calculation result to the block 402.

The block 402 is implemented by, for example, the ECUs 29A and 20A shown in FIG. 1. The block 402 determines an optimum route based on the external information recognition result, vehicle motion information such as a speed or acceleration, and operation information (a steering amount, an accelerator amount, and the like) from a driver 409. At this time, a travel model 405 and a risk avoidance model 406 are taken into consideration. Each of the travel model 405 and the risk avoidance model 406 is, for example, a travel model generated as a result of learning based on probe data collected in advance by the server in test travel by an expert driver. Particularly, the travel model 405 is a model generated for each scene such as a curve or intersection, and the risk avoidance model 406 is, for example, a model of sudden braking prediction of a preceding vehicle or movement prediction of a moving object such as a pedestrian. The travel model and the risk avoidance model generated by the server are implemented as the travel model 405 and the risk avoidance model 406 in the vehicle V, respectively. If an automated driving support system is formed in the vehicle V, the block 402 decides a support amount based on a target value and operation information from the driver 409, and transmits the support amount to a block 403.

The block 403 is implemented by, for example, the ECUs 22A, 23A, 24A, and 27A shown in FIG. 1. For example, the control amount of an actuator is decided based on the optimum route and the support amount determined in the block 402. An actuator 404 includes a steering system, a braking system, a stop maintenance system, an internal notification system, and an external notification system. A block 407 is an HMI (Human Machine Interface) as an interface with the driver 409, and is implemented as the input device 45A or 45B. The block 407 accepts a notification of switching between the automated driving mode and the driver driving mode, or accepts, if the vehicle V is driven by the above-described expert driver, a comment from the driver when transmitting probe data.

In this embodiment, the vehicle V uses one of the cameras 31A and 31B to extract a division line or a travel path boundary on a road, thereby performing automated driving control. The division line includes a lane such as a white line or yellow line. In this embodiment, the division line and the travel path boundary as image capturing targets of the cameras 31A and 31B will be collectively be referred to as road shapes. A road shape extracted from an image captured by the camera is compared with information of a road shape acquired from the map information and the position information (GPS information acquired from the GPS sensor) of the vehicle V. The road shape is recognized based on whether the above pieces of information match each other, and automated driving control is executed based on this recognition.

If the operation of the currently used camera 31A (or camera 31B) becomes unstable due to some factor during execution of automated driving control, the camera is switched. This example assumes that the camera is switched from the camera 31A to the camera 31B. At this time, the vehicle V requests the driver to participate in driving. In this embodiment, for example, the driver is requested to grip the steering wheel (hands-on) or monitor a driving environment (eyes-on).

With this arrangement, only one of the cameras 31A and 31B is used to recognize the road shape. Therefore, arbitration between the cameras becomes unnecessary, and it is possible to reduce the processing loads of the ECUs, as compared with a case in which both the cameras are used. When switching the camera, the driver is required to participate in driving, and it is thus possible to enhance the degree of participation of the driver in driving before the operations of the two cameras 31A and 31B become unstable. As a result, it is possible to smoothly perform switching (takeover) of automated driving control to manual driving control.

<Switching of Driving Control Along with Switching of Camera>

Figure 5:
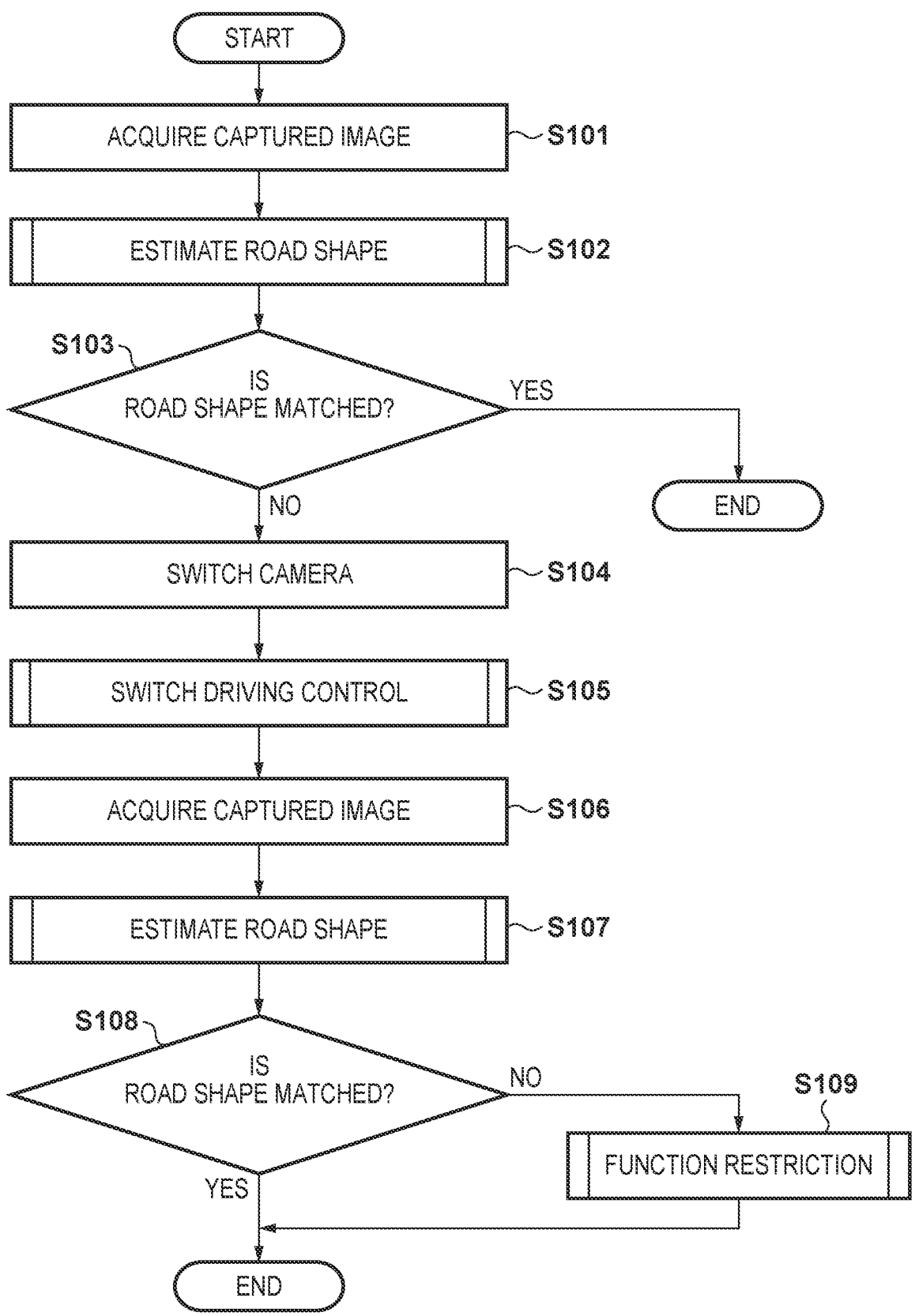
FIG. 5 is a flowchart illustrating driving control switching processing.

FIG. 5 is a flowchart illustrating processing of switching driving control by switching the camera according to this embodiment. The processing shown in FIG. 5 is executed when automated driving control is performed. Assume that only the camera 31A is used to recognize a road shape.

In step S101, the block 402 acquires an image captured by the camera 31A. In step S102, the block 402 estimates a road shape based on the captured image acquired in step S101. Note that instead of the block 402, the block 401 may perform the processes in steps S101 and S102.

Figure 6:
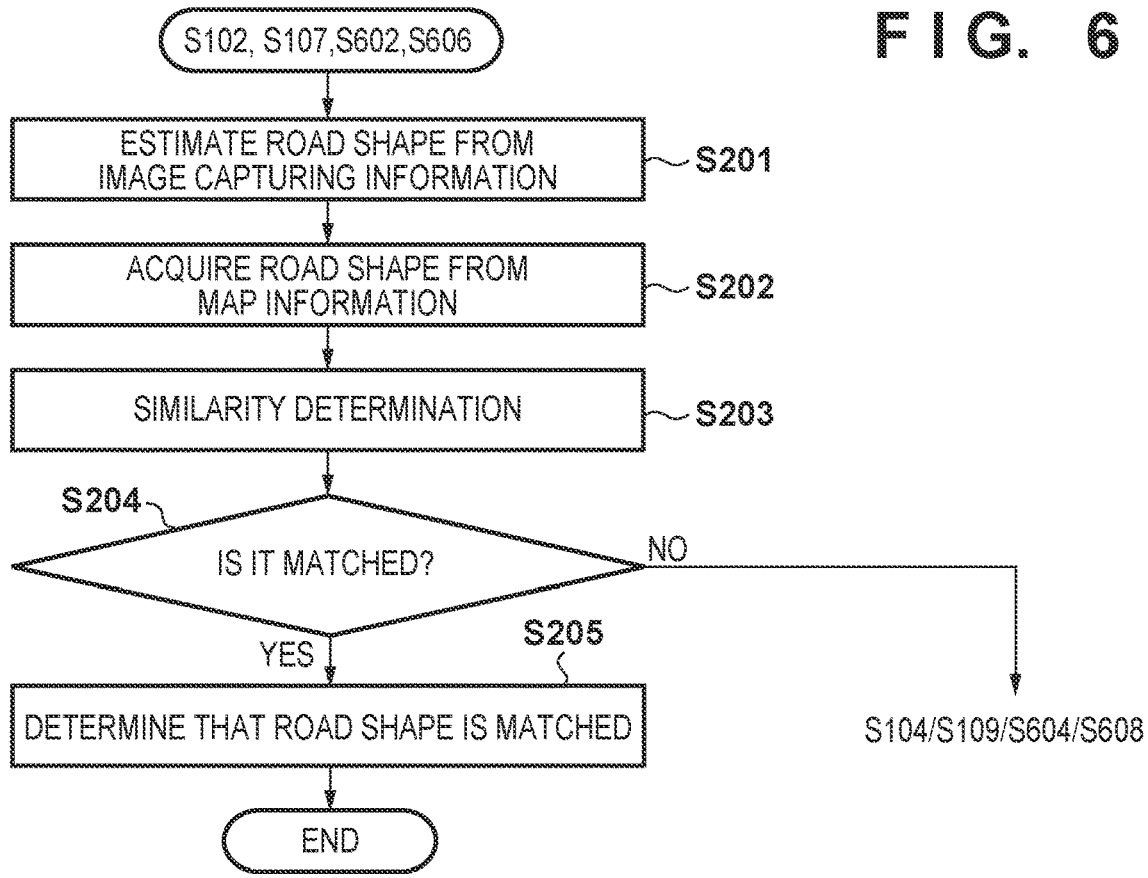
FIG. 6 is a flowchart illustrating processing of estimating a road shape and determining similarity.

FIG. 6 is a flowchart illustrating the processing in step S102. In step S201, the block 402 estimates a road shape based on image capturing information. For example, the block 402 extracts a white line by performing pixel analysis for the image captured by the camera 31A.

In step S202, the block 402 estimates a road shape based on the map information. For example, the block 402 acquires information of the current position of the vehicle V from the GPS information, and acquires information of a road shape corresponding to the current position from the map information.

In step S203, the block 402 compares the estimation result in step S201 with the acquisition result in step S202, and determines the similarity between them. For example, the block 402 compares the white line estimated from the image captured by the camera 31A with the white line information acquired from the map information. The similarity may be obtained as, for example, the sum of the similarities of respective feature amounts such as the type of the road shape, the color, and the curvature of a curve.

In step S204, the block 402 determines whether the estimation result in step S201 matches the acquisition result in step S202. If it is determined in step S204 that the results match each other, the process advances to step S205 to determine that the road shape recognized by the camera 31A matches the road shape information on the map information. Then, the processing shown in FIG. 6 ends. On the other hand, if it is determined in step S204 that the results do not match each other, the process advances to step S104 of FIG. 5 to switch the camera.

If it is determined that the road shape is not recognized, the following reasons can be considered. For example, an operation abnormality occurs in the camera 31A. For example, the camera 31A may not be in an image capturing enable state due to a temperature abnormality, a voltage abnormality, or an axial shift. Alternatively, although the camera 31A is in a normal operation state, it may not be in the image capturing enable state since dirt, snow, or the like is accumulated on the windshield attached with the camera 31A.

The determination processing in step S204 may be performed in consideration of the normal/reduced performance state of the camera 31A. For example, even if the white line acquired from the map information has a curve shape, the white line may be extracted to have a linear shape in the image captured by the camera 31A due to recent construction of the division line or the like. Even if it is determined in step S204 that the results do not match each other, if none of a temperature abnormality, a voltage abnormality, an axial shift, and a luminance abnormality of the captured image occurs in the camera 31A, neither an internal disturbance factor nor an external disturbance factor occurs in the camera 31A, and it may thus be determined that the results match each other. Note that such determination may be executed by performing self-diagnostic of the camera 31A when it is determined in step S204 that the results do not match each other.

In step S103 of FIG. 5, based on the processing result of FIG. 6, the block 402 determines whether the road shape recognized by the camera 31A matches that on the map information. That is, if it is determined in step S204 of FIG. 6 that the results match each other and the process advances to step S205, it is determined in step S103 that the road shapes match each other, and the processing shown in FIG. 5 ends. On the other hand, if it is determined in step S204 of FIG. 6 that the results do not match each other, it is determined in step S103 that the road shapes do not match each other, and the process advances to step S104.

In step S104, the block 402 switches the camera from the camera 31A to the camera 31B. In step S105, the block 402 switches driving control (to be described later).

FIG. 9 is a flowchart illustrating the processing in step S105. In step S501, the block 402 requests the driver to participate in driving. For example, the block 402 requests the driver to grip the steering wheel (hands-on) or monitor a driving environment (eyes-on). In this case, the block 402 displays a message such as "grip the steering wheel" or "monitor the driving environment" on the HMI 407. Alternatively, if it is recognized by the internal camera that the driver has closed his/her eyelids, the driver may be notified of it by retracting a seatbelt. The driver may also be notified that the camera 31A is in the reduced performance state.

In step S502, the block 402 switches driving control to reduce the contribution ratio of driving control of the vehicle V. For example, if the block 402 requests, in step S501, the driver to grip the steering wheel, control is switched from control for causing the vehicle V to travel while keeping the vehicle V at the center of the lane to control for preventing the vehicle V from deviating from the travel lane by driving by the driver. After step S502, the processing shown in FIG. 9 ends.

After switching driving control in step S105 of FIG. 5, the block 402 acquires, in step S106, an image captured by the camera 31B, similar to step S101. Similar to step S102, in step S107, the block 402 estimates a road shape based on the captured image acquired in step S106.

Similar to step S103, in step S108, the block 402 determines whether the road shape is recognized based on the processing result of FIG. 6. That is, if it is determined in step S204 of FIG. 6 that the results match each other and the process advances to step S205, it is determined in step S108 that the road shapes match each other, and the processing shown in FIG. 5 ends. On the other hand, if it is determined in step S204 of FIG. 6 that the results do not match each other, it is determined in step S108 that the road shapes do not match each other, and the process advances to step S109.

Figure 7:
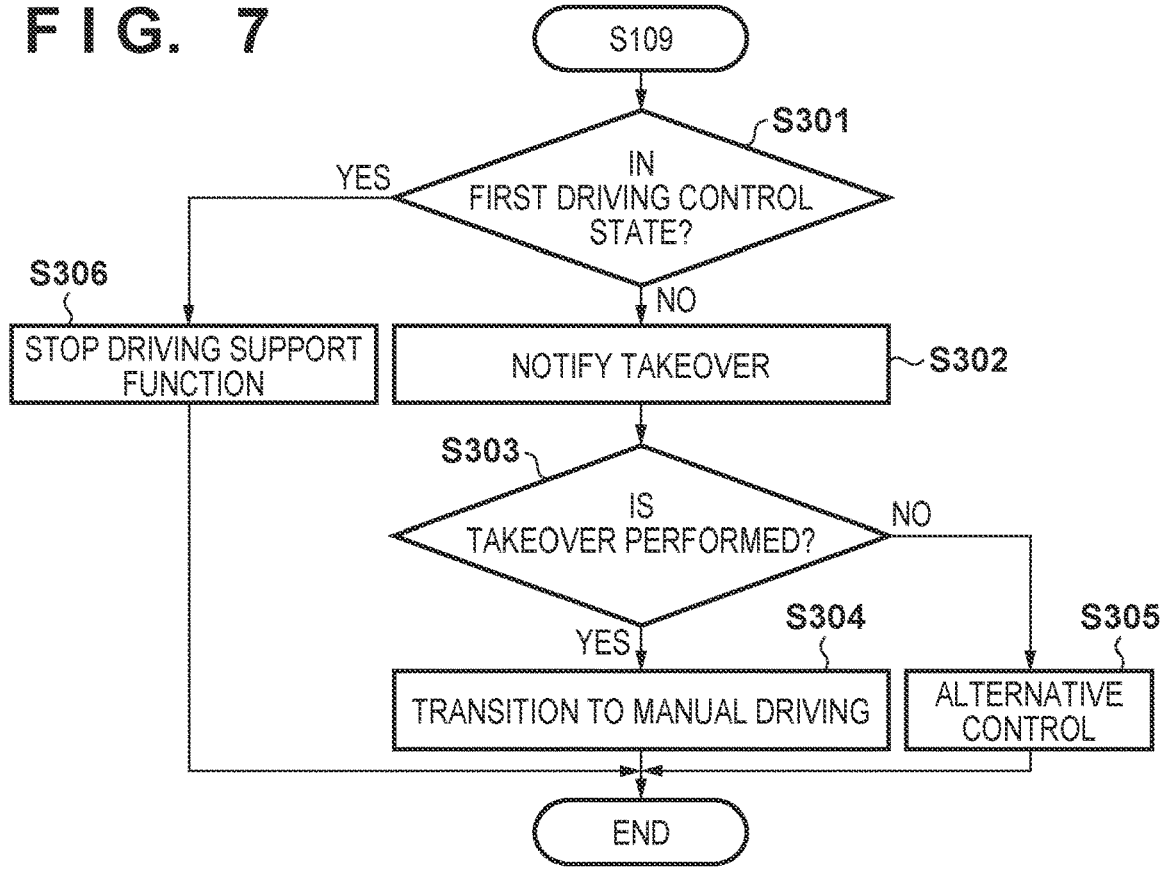
FIG. 7 is a flowchart illustrating function restriction processing.

FIG. 7 is a flowchart illustrating the processing in step S109. A case in which it is determined in step S108 that the road shape is not recognized indicates a state in which neither the camera 31A nor the camera 31B can perform image capturing. In this embodiment, in such case, a function restriction is imposed in accordance with the driving control state of the vehicle V. The function restriction indicates transition of the driving control state (for example, transition to the driving control state in which the participation of the driver in driving is higher) or performing alternative control in accordance with the driving control state.

In step S301, the block 402 determines whether the driving control state of the vehicle V is a predetermined driving control state (in this example, the first driving control state). The first driving control state is, for example, a state in which the driving support function is executed by requiring the driver to grip the steering wheel. If it is determined in step S301 that the driving control state is the first driving control state, the process advances to step S306, and the block 402 notifies, via the HMI 407, the driver that the driving support function is to be stopped, and stops the driving support function. After that, the processing shown in FIG. 7 ends.

On the other hand, if it is determined in step S301 that the driving control state is not the first driving control state, for example, if the driver is not requested to grip the steering wheel in step S501 but requested to monitor the driving environment, the current state is a state in which neither the camera 31A nor the camera 31B can perform image capturing, driving control is switched from automated driving control to manual driving control.

In step S302, the block 402 determines that takeover is necessary, and notifies, via the HMI 407, the driver of a request of switching from automated driving control to manual driving control (a notification of a takeover request). For example, a message for requesting the driver to perform takeover may be displayed on the user interface screen. In step S303, the block 402 determines whether the driver has performed takeover. For example, if the block 402 determines that the driver has performed takeover by gripping the steering wheel in accordance with display on the user interface screen, the process advances to step S304. In step S304, the block 402 performs transition from automated driving control to manual driving control. After that, the processing shown in FIG. 7 ends.

On the other hand, it is determined in step S303 that the driver has not performed takeover, the process advances to step S305. For example, if the driver has not performed takeover for a predetermined time, the block 402 advances the process to step S305. In step S305, the block 402 performs alternative control. After that, the processing shown in FIG. 7 ends.

FIG. 8 is a flowchart illustrating the processing in step S305. In step S401, the block 402 recognizes a stop enable position. For example, based on map information, the pieces of information obtained by the GPS sensor, gyro sensor, and LIDARS, the block 402 recognizes shoulders where the vehicle V can stop. In step S402, the block 402 recognizes a route up to the stop enable position, and decides the control amount of the actuator. In step S403, the block 403 controls the block 404 (actuator) based on the decided control amount of the actuator. After that, the processing shown in FIG. 8 ends.

As described above, according to this embodiment, at the time of normal automated driving control, a road shape is recognized using one camera. If the operation of the camera becomes unstable, the camera is switched to the other camera. Along with switching of the camera, the driver is requested to participate in driving. With this arrangement, the participation of the driver in driving can be increased before the operation of the other camera also becomes unstable. When the operation of the other camera becomes unstable, takeover can be executed smoothly.

A case in which the camera is switched from the camera 31A to the camera 31B has been explained above. Both the above-described cameras capture the front side of the vehicle V. The operation shown in FIG. 5 may be performed between the camera 31A and a rear camera that captures the rear side or rear lateral side of the vehicle V. That is, if it becomes impossible to recognize a road shape by the camera 31A, the camera may be switched to the rear camera in step S104. With this arrangement, for example, the driver is requested to grip the steering wheel in step S501, and lane deviation suppression control is executed using the rear camera in step S502.

In the above description of FIG. 5, the processing shown in FIG. 5 starts when automated driving control is performed. However, the processing shown in FIG. 5 may be executed when driving support control is performed. In this case, after the camera is switched in step S104, a support amount for the driver is reduced in steps S105 and S502. For example, in step S502, the upper limit of a suppression torque for suppressing lane deviation with respect to the steering torque of the driver may be decreased.

<Another Processing Along with Switching of Camera>

In the above description of FIG. 5, if, after the camera is switched, it is determined in step S108 that a road shape is not recognized, a function restriction is imposed in step S109. However, driving control may be continued without imposing a function restriction when the device is switched for recognition of a road shape. This arrangement will be described below.

Figure 10:
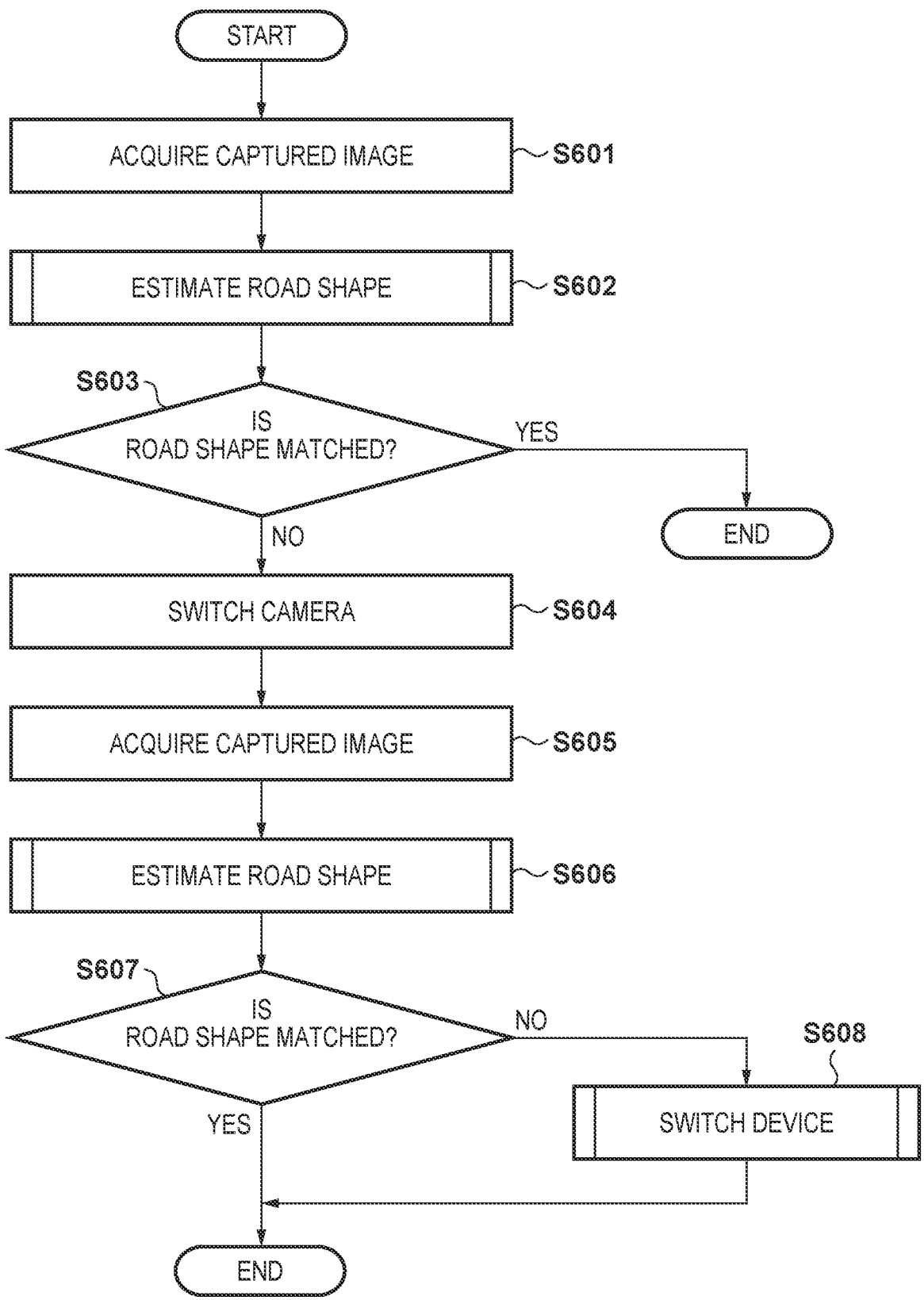
FIG. 10 is a flowchart illustrating processing performed along with switching of a camera.

FIG. 10 is a flowchart illustrating processing related to switching of the camera. Steps S601 to S604 are the same as steps S101 to S104 of FIG. 5, and a description thereof will be omitted. However, in FIG. 10, driving support control by the vehicle V is performed.

In FIG. 5, the camera is switched in step S104, and then driving control is switched in step S105. However, in FIG. 10, an image captured by the camera after switching, that is, the camera 31B is acquired in step S605, similar to step S106, without switching driving control. Similar to step S602, in step S606, the block 402 estimates a road shape based on the captured image acquired in step S605. Similar to step S603, in step S607, the block 402 determines whether the road shapes match each other. That is, if it is determined in step S204 of FIG. 6 that the results match each other and the process advances to step S205, it is determined in step S607 that the road shapes match each other, and the processing shown in FIG. 10 ends. On the other hand, if it is determined in step S204 of FIG. 6 that the results do not match each other, it is determined in step S607 that the road shapes do not match each other, and the process advances to step S608.

Figure 11:
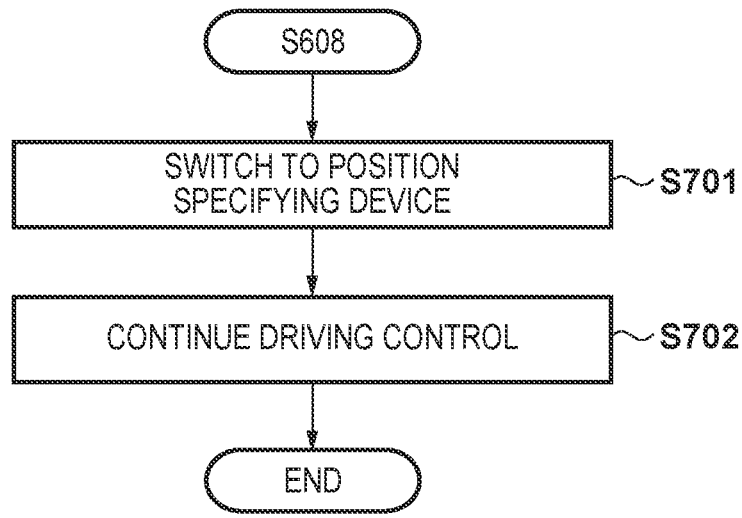
FIG. 11 is a flowchart illustrating device switching processing.

FIG. 11 is a flowchart illustrating the processing in step S608. In step S701, the block 402 switches the device to be used to recognize a road shape from the camera to a position specifying device. The position specifying device is a device for specifying the position of the vehicle V, and is, for example, a gyro sensor or a GPS sensor.

In step S702, the block 402 acquires a road shape from the map information based on position information obtained by the position specifying device, and continues driving control based on the acquired road shape. After step S702, the processing shown in FIG. 11 ends.

The camera unwantedly enters an image capturing disable state due to not only an internal disturbance such as a voltage abnormality but also an external disturbance such as dirt on the windshield attached with the camera. On the other hand, such factors are difficult to occur in the position specifying device. Therefore, as in FIGS. 10 and 11, a road shape is recognized by switching the camera to the position specifying device such as a gyro sensor or a GPS sensor, and driving support control such as white line tracking is continued. If driving control is continued in step S702, the driver may be notified via the HMI 407 that the operations of the cameras 31A and 31B are unstable. At the time of notification, an instruction of switching to manual driving control may be selectably accepted from the driver. If switching to manual driving control is instructed, switching to manual driving control is performed.

<Switching of Driving Control in Accordance with Operation State of Device>

In the description of FIGS. 5 and 10, when the operation of the camera 31A becomes unstable, the camera is switched from the camera 31A to the camera 31B. However, if it is detected, during driving control, that the operation of one of the cameras 31A and 31B and the position specifying device becomes unstable, driving control may be switched.

Figure 12:
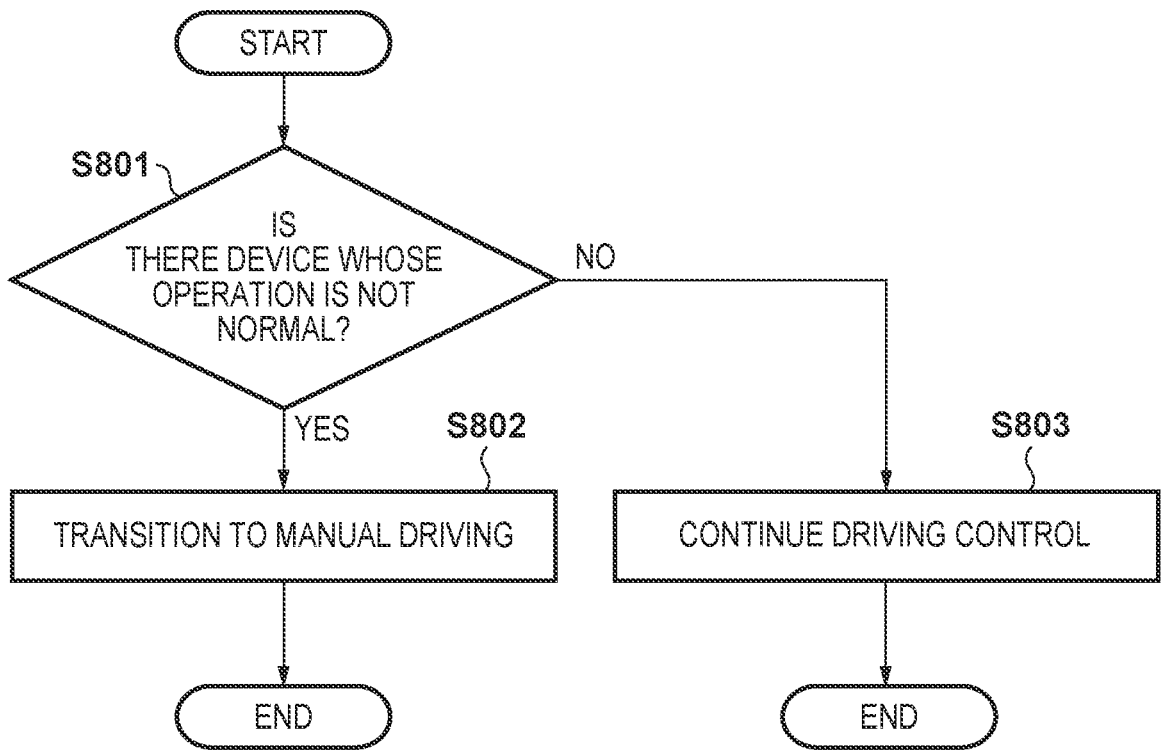
FIG. 12 is a flowchart illustrating driving control switching processing.

FIG. 12 is a flowchart illustrating switching of driving control in accordance with the operation state of the device. In step S801, the block 402 determines whether there is a device whose operation is not normal. For example, the block 402 determines whether there is a device whose operation is unstable among the cameras 31A and 31B and the position specifying device. As for the cameras 31A and 31B, if, as a result of the processing in step S203 of FIG. 6, it is determined in step S204 that the results do not match other, it may be determined that the operation is unstable. Self-diagnostic of each of the cameras 31A and 31B and the position specifying device may be executed at a predetermined time interval and, based on the result, it may be determined whether the operation is unstable.

If it is determined in step S801 that there is a device whose operation is not normal, the block 402 performs, in step S802, processing of causing driving control of the vehicle V to transit to manual driving control. In this processing, for example, the block 402 determines that takeover is necessary, and displays, on the user interface screen, via the HMI 407, a message for requesting the driver to switch driving control from automated driving control to manual driving control. If it is determined that the driver has performed takeover by gripping the steering wheel in accordance with display on the user interface screen, the block 402 performs transition from automated driving control to manual driving control. As another example of the processing in step S802, the block 402 may stop the driving support function of the vehicle V. On the other hand, if it is determined in step S801 that there is no device whose operation is not normal, the current driving control of the vehicle V is continued. The driving control state executed in step S803 indicates a driving control state in which the participation of the driver in driving is lower than in the driving control state executed as a result of the processing in step S802. For example, the driving control state executed as a result of the processing in step S802 is a driving control state in which the driver needs to grip the steering wheel, and the driving control state executed in step S803 is a driving control state in which the driver need not grip the steering wheel.

In the above description, it is determined in step S801 whether there is a device whose operation is unstable among the cameras 31A and 31B and the position specifying device. However, it may be determined whether the operation of the position specifying device is unstable. Then, if it is determined that the operation of the position specifying device is unstable, the process advances to step S802; otherwise (normal operation state), the process advances to step S803.

That is, if the position specifying device, for example, a GPS sensor enters a reception disable state, even if both the cameras 31A and 31B operate normally, the driver is requested to perform takeover such as the grip of the steering wheel. Both the cameras 31A and 31B may be shielded due to the appearance of some object, or an image capturing result may be defective due to strong external light such as the westering sun. At this time, if the operation of the position specifying device is unstable, it is difficult to perform switching to manual driving control smoothly. To solve this problem, as described above, it is possible to perform switching to manual driving control smoothly by requesting the driver to perform takeover such as the grip of the steering wheel when the operation of the position specifying device becomes unstable.

Summary of Embodiment

A travel control apparatus according to the above embodiment is a travel control apparatus for controlling travel of a vehicle, comprising an acquisition unit configured to acquire external information using one of a first camera and a second camera (S101, S106), a specifying unit configured to specify a position of the vehicle (GPS 28b), and a travel control unit configured to control the travel of the vehicle based on the external information acquired by the acquisition unit and the position of the vehicle specified by the specifying unit (S105), wherein if the acquisition unit acquires the external information using the second camera instead of the first camera, the travel control unit controls the travel of the vehicle so that a degree of participation of a driver in driving is higher than in a case in which the acquisition unit acquires the external information using the first camera (S105).

With this arrangement, for example, if a state is set in which the first camera cannot perform image capturing, it is possible to control the travel of the vehicle to increase the degree of participation of the driver in driving. As a result, adjustment processing between the cameras becomes unnecessary, and it is thus possible to reduce the processing loads of the ECUs.

If the acquisition unit acquires the external information using the second camera instead of the first camera, the travel control unit requests the driver to monitor a driving environment. With this arrangement, for example, if a state is set in which the first camera cannot perform image capturing, it is possible to perform a smooth transition to manual driving by requesting the driver to monitor the driving environment.

If the acquisition unit acquires the external information using the second camera instead of the first camera, the travel control unit requests the driver to grip the steering wheel. With this arrangement, for example, if a state is set in which the first camera cannot perform image capturing, it is possible to perform smooth transition to manual driving by requesting the driver to grip the steering wheel.

If the acquisition unit acquires the external information using the second camera instead of the first camera, the travel control unit switches travel control from travel control that does not require a grip of the steering wheel to travel control that requires a grip of the steering wheel. With this arrangement, for example, if a state is set in which the first camera cannot perform image capturing, it is possible to perform smooth transition to manual driving by switching travel control from travel control that does not require the grip of the steering wheel to travel control that requires the grip of the steering wheel.

If the acquisition unit acquires the external information using the second camera instead of the first camera, the travel control unit switches travel control from travel control that causes the vehicle to track a lane to travel control that prevents the vehicle from deviating from the lane. With this arrangement, for example, even if a state in which the first camera cannot perform image capturing is set during automated driving, it is possible to provide a possible function as driving support.

If the acquisition unit acquires the external information using the second camera instead of the first camera, the travel control unit reduces a support amount of driving support for the driver. With this arrangement, for example, if a state is set in which the first camera cannot perform image capturing, it is possible to perform smooth transition to manual driving by increasing the degree of participation of the driver in driving.

If a state is set in which the first camera cannot perform image capturing, the acquisition unit acquires the external information using the second camera instead of the first camera (S104). With this arrangement, if a state is set in which the first camera cannot perform image capturing, the external information can be acquired using the second camera.

If a state is set in which the second camera cannot perform image capturing, the travel control unit restricts the travel of the vehicle (S109). The travel control unit performs switching to manual driving control (S304). The travel control unit stops a driving support function (S306). With this arrangement, if a state is set in which the second camera cannot perform image capturing, the travel of the vehicle is switched to manual driving or the driving support function is stopped, and it is thus possible to provide a possible function as driving support or automated driving to the driver.

A travel control apparatus according to the above embodiment is a travel control apparatus for controlling travel of a vehicle, comprising an acquisition unit configured to acquire external information using one of a first camera and a second camera (S101, S106, S601, S605), a device configured to specify a position of the vehicle (GPS 28b), and a travel control unit configured to control the travel of the vehicle based on the external information acquired by the acquisition unit and the position of the vehicle specified by the device (S105), wherein if a state is set in which at least one of the first camera, the second camera, and the device cannot operate, the travel control unit controls the travel of the vehicle so that a degree of participation of a driver in driving is higher than in a case in which the first camera, the second camera, and the device can operate (S105).

With this arrangement, it is possible to control, in accordance with the operation state of the device, the travel of the vehicle to increase the degree of participation of the driver in driving.

What is claimed is:

1. A travel control apparatus for controlling travel of a vehicle, comprising:
    at least one processor, and
    at least one memory comprising instructions that, when executed, cause the at least one processor to at least:
    acquire external information using one of a first camera or a second camera;
    determine whether one of the first camera or the second camera that the at least one processor acquires the external information from is in a normal operation state;
    specify a position of the vehicle; and
    control the travel of the vehicle based on the acquired external information and the specified position of the vehicle,
    wherein if the at least one processor determines that the first camera is not in the normal operation state based on the external information acquired from the first camera, the at least one processor acquires the external information using the second camera instead of the first camera,
    wherein if the at least one processor acquires the external information using the second camera instead of the first camera, the at least one processor reduces a contribution ratio of controlling the travel of the vehicle, and
    wherein if the at least one processor acquires the external information using the second camera instead of the first camera and the second camera cannot perform image capturing, the at least one processor switches travel control to manual driving control.

2. The apparatus according to claim 1, wherein if the at least one processor acquires the external information using the second camera instead of the first camera in automated driving, the at least one processor is further configured to request the driver to monitor a driving environment as participation of the driver in driving.

3. The apparatus according to claim 1, wherein if the at least one processor acquires the external information using the second camera instead of the first camera in automated driving, the at least one processor is further configured to request the driver to grip a steering wheel as participation of driver in driving.

4. The apparatus according to claim 3, wherein if the at least one processor acquires the external information using the second camera instead of the first camera in automated driving, the at least one processor is further configured to switch travel control from travel control that does not require a grip of the steering wheel to travel control that requires a grip of the steering wheel.

5. The apparatus according to claim 3, wherein if the at least one processor acquires the external information using the second camera instead of the first camera in automated driving, the at least one processor is further configured to switch travel control from travel control that causes the vehicle to track a lane to travel control that prevents the vehicle from deviating from the lane.

6. The apparatus according to claim 1, wherein if the first camera cannot perform image capturing, the at least one processor acquires the external information using the second camera instead of the first camera.

7. The apparatus according to claim 1, wherein if the second camera cannot perform image capturing, the at least one processor is further configured to restrict the travel of the vehicle.

8. The apparatus according to claim 7, wherein the at least one processor stops a driving support function.

9. A travel control apparatus for controlling travel of a vehicle, comprising:
at least one processor, and
at least one memory comprising instructions that, when executed, cause the at least one processor to at least:
acquire external information using one of a first camera or a second camera;
determine whether at least one of the first camera, the second camera or a device configured to specify a position of the vehicle cannot operate;
control the travel of the vehicle based on the acquired external information and the specified position of the vehicle,
wherein if the at least one processor acquires the external information using the second camera instead of the first camera and the second camera cannot perform image capturing, the at least one processor switches travel control to manual driving control.

10. A travel control method executed in a travel control apparatus for controlling travel of a vehicle, comprising:
acquiring external information using one of a first camera or a second camera;
determining whether one of the first camera or the second camera that the at least one processor acquires the external information from is in a normal operation state;
specifying a position of the vehicle; and
controlling the travel of the vehicle based on the acquired external information and the specified position of the vehicle,
wherein if it is determined that the first camera is not in the normal operation state based on the external information acquired from the first camera, the external information is acquired using the second camera instead of the first camera,
wherein if the external information is acquired using the second camera instead of the first camera, a contribution ratio of controlling the travel of the vehicle is reduced, and
wherein if the external information is acquired using the second camera instead of the first camera and the second camera cannot perform image capturing, travel control is switched to manual driving control.

11. A travel control method of controlling travel of a vehicle, comprising:
acquiring external information using one of a first camera or a second camera;
determining whether at least one of the first camera, the second camera, or a device configured to specify a position of the vehicle cannot operate; and
controlling the travel of the vehicle based on the acquired external information acquired and the specified position of the vehicle,
wherein if the external information is acquired using the second camera instead of the first camera and the second camera cannot perform image capturing, travel control is switched to manual driving control.

12. A non-transitory computer-readable storage medium storing a program for causing a computer to:
acquire external information using one of a first camera or a second camera;
determine whether one of the first camera or the second camera that the at least one processor acquires the external information from is in a normal operation state;
specify a position of a vehicle; and
control travel of the vehicle based on the acquired external information and the specified position of the vehicle,
wherein if it is determined that the first camera is not in the normal operation state based on the external information acquired from the first camera, the external information is acquired using the second camera instead of the first camera, and
wherein the external information is acquired using the second camera instead of the first camera, a contribution ratio of controlling the travel of the vehicle is reduced
wherein if the external information is acquired using the second camera instead of the first camera and the second camera cannot perform image capturing, travel control is switched to manual driving control.

13. A non-transitory computer-readable storage medium storing a program for causing a computer to:
acquire external information using one of a first camera or a second camera;
determine whether at least one of the first camera, the second camera, or a device configured to specify a position of the vehicle cannot operate; and
control travel of a vehicle based on the acquired external information and a specified position of the vehicle specified by the device configured to specify the position of the vehicle, and
wherein if the external information is acquired using the second camera instead of the first camera and the second camera cannot perform image capturing, travel control is switched to manual driving control.

* * * * *